United States Patent
Kaler et al.

(10) Patent No.: US 7,512,782 B2
(45) Date of Patent: Mar. 31, 2009

(54) METHOD AND SYSTEM FOR USING A WEB SERVICE LICENSE

(75) Inventors: Christopher G. Kaler, Sammamish, WA (US); John P. Shewchuk, Redmond, WA (US); Giovanni Moises Della-Libera, Seattle, WA (US); Robert George Atkinson, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 716 days.

(21) Appl. No.: 10/218,584

(22) Filed: Aug. 15, 2002

(65) Prior Publication Data

US 2004/0034770 A1 Feb. 19, 2004

(51) Int. Cl.
- H04L 9/00 (2006.01)
- G06F 7/04 (2006.01)
- G06F 7/58 (2006.01)
- G06F 17/30 (2006.01)
- H04K 1/00 (2006.01)
- G06K 15/00 (2006.01)
- G09F 3/00 (2006.01)

(52) U.S. Cl. ............ 713/155; 726/2; 726/10; 726/26; 705/51; 705/59

(58) Field of Classification Search ........... 726/26, 726/10, 2; 713/155; 705/59, 51
See application file for complete search history.

(56) References Cited

U.S. PATENT DOCUMENTS

2003/0220880 A1* 11/2003 Lao et al. ............ 705/51

FOREIGN PATENT DOCUMENTS

WO WO 2008119817 A2 * 10/2008

OTHER PUBLICATIONS

G. Canfora, G. Di Santo, G. Venturi, E. Zimeo, M. V. Zito, "Migrating web application sessions in mobile computing", May 2005 ACM WWW '05: Special interest tracks and posters of the 14th international conference on World Wide Web, pp. 1166-1167.*
U.S. Appl. No. 10/068,444, filed Feb. 6, 2002, Della-Libera et al.

* cited by examiner

Primary Examiner—Minh Dieu Nguyen
Assistant Examiner—Courtney D Fields
(74) Attorney, Agent, or Firm—Workman Nydegger (57) ABSTRACT

A method and system are provided such that a universal license may be used for authentication and authorization purposes and may include one or more cryptographic keys as well as assertions and related indications of authenticity. In an aspect of the invention, a license may be presented that includes access information, such that authentication and authorization decisions may be made based only on the access information. In other aspects of the invention, rights may be delegated and a trusted party may assert that another party can be trusted.

9 Claims, 7 Drawing Sheets

Figure 1

```
<license>
  <assertions>...</assertions>
  <signatures>...</signatures>
</license>
```

Figure 2A

```
<License>
  <Claim ID=1>...</Claim>
  <Claim ID=2>...</Claim>
  <Signature ID=Sig1 Reason=x><Ref ID=1/><Ref ID=2/></Signature>
</License>
```

Figure 2B

```
<License>
  <Claim ID=1>...</Claim>
  <Claim ID=2>...</Claim>
  <Signature ID=Sig1 Reason=x><Ref ID=1/><Ref ID=2/></Signature>
  <Claim ID=3>...</Claim>
  <Claim ID=4>...</Claim>
  <Signature ID=Sig2 Reason=x><Ref ID=3/><Ref ID=4/></Signature>
</License>
```

Figure 2C

```
<License>
  <Claim ID=1>...</Claim>
  <Claim ID=2>...</Claim>
  <Signature ID=Sig1 Reason=x><Ref ID=1/><Ref ID=2/></Signature>
  <Claim ID=3>...</Claim>
  <Claim ID=4>...</Claim>
  <Signature ID=Sig2 Reason=x><Ref ID=3/><Ref ID=4/></Signature>
  <Signature ID=Sig3 Reason=y><Ref ID=1/><Ref ID=2/>
       <Ref ID=3/><Ref ID=4/>
       <Ref ID=Sig2/>
  </Signature></License>
```
⎱240

Figure 2D

```
<assertion id=... algorithm=...>
    <key type=... for=... algorithm=...>...</key>
    <name language=...>...</name>
    <statements id=... algorithm=...>...</statements>
    <delegate id=... algorithm=...>...</delegate>
</assertion>
```

Figure 3

```
<delegate>
    <to>...</to>
    <condition>...</condition>
    <x>...</x>
</delegate>
```

Figure 4

<signature type=... authority=... timestamp=...>
<assertionIDs><id ref=.../>...</assertionIDs>
<sig cannonicalization=... algorithm=...>...</sig>
</signature>

METHOD AND SYSTEM FOR USING A WEB SERVICE LICENSE

FIELD OF THE INVENTION

The present invention relates to a system and a method for providing authentication and authorization data. More specifically, the invention relates to enabling web services to process authentication and authorization data.

BACKGROUND OF THE INVENTION

Today's credential formats do not offer the flexibility to meet the needs of high-scale/high-availability web services. For example, X.509 is very good for asymmetric key authentication, but is very difficult to use for anything else. One reason for this is that X.509 is based on Asynchronous Syntax Notation One (ASN.1) and requires compiling of specialized code to process an X.509 license. X.509 allows extensions, but the extensions are limited and not widely supported. Kerberos is another common format which focuses on arbitrated authentication using symmetric keys, but is not designed to be used for other types of authentication. Kerberos has an extensibility field, but there are no conventions or interoperability. EXtensible resource Markup Language (XrML), version 1, is limited because it doesn't support delegation and many other concepts and focuses on digital rights management.

Thus, there is a need for a format that can be used for different authentication and authorization purposes and that provides the flexibility to meet the demands of high-scale/high availability web services.

BRIEF SUMMARY OF THE INVENTION

The present invention addresses the above-mentioned problems by providing flexible credential formats for meeting the needs of high-scale/high-availability web services. The present invention introduces the concept of a universal license. A universal license may be used for authentication and authorization purposes and may include one or more cryptographic keys as well as assertions and related indications of authenticity.

In an aspect of the invention, a universal license includes at least one addressable portion. Each addressable portion may include one or more assertions or one or more indications of authenticity, such as a digital signature. The license may be formatted such that assertions and indications of authenticity may be added to the license without affecting existing assertions and indications of authenticity.

In an aspect of the invention, a license may be presented that includes prefetched access information, such that authentication and authorization decisions may be made based only on the access information.

In other aspects of the invention, rights may be delegated, such that a party may delegate his right to access a resource. The delegations may be restricted to a specific number of times the resource may be accessed or the access may be allowed only during a specific time period or time window, or access may be permitted only for a specific use, for example, only permitting access to a party's calendar to check the party's free time. Further, a party with delegated rights may sub-delegate aspects of the delegated rights subject to restrictions.

In other aspects of the invention a trusted party may assert that another party can be trusted.

BRIEF DESCRIPTION OF THE DRAWINGS

The present invention is described with respect to the accompanying figures, in which like reference numerals identify like elements, and in which.

DETAILED DESCRIPTION

Operating Environment

Aspects of the present invention are suitable for use in an environment of networked computer devices. Embodiments of the present invention may comprise special purpose and/or general purpose computer devices that each may include standard computer hardware, such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, network PCS, minicomputers, mainframe computers, and the like.

The above-mentioned computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
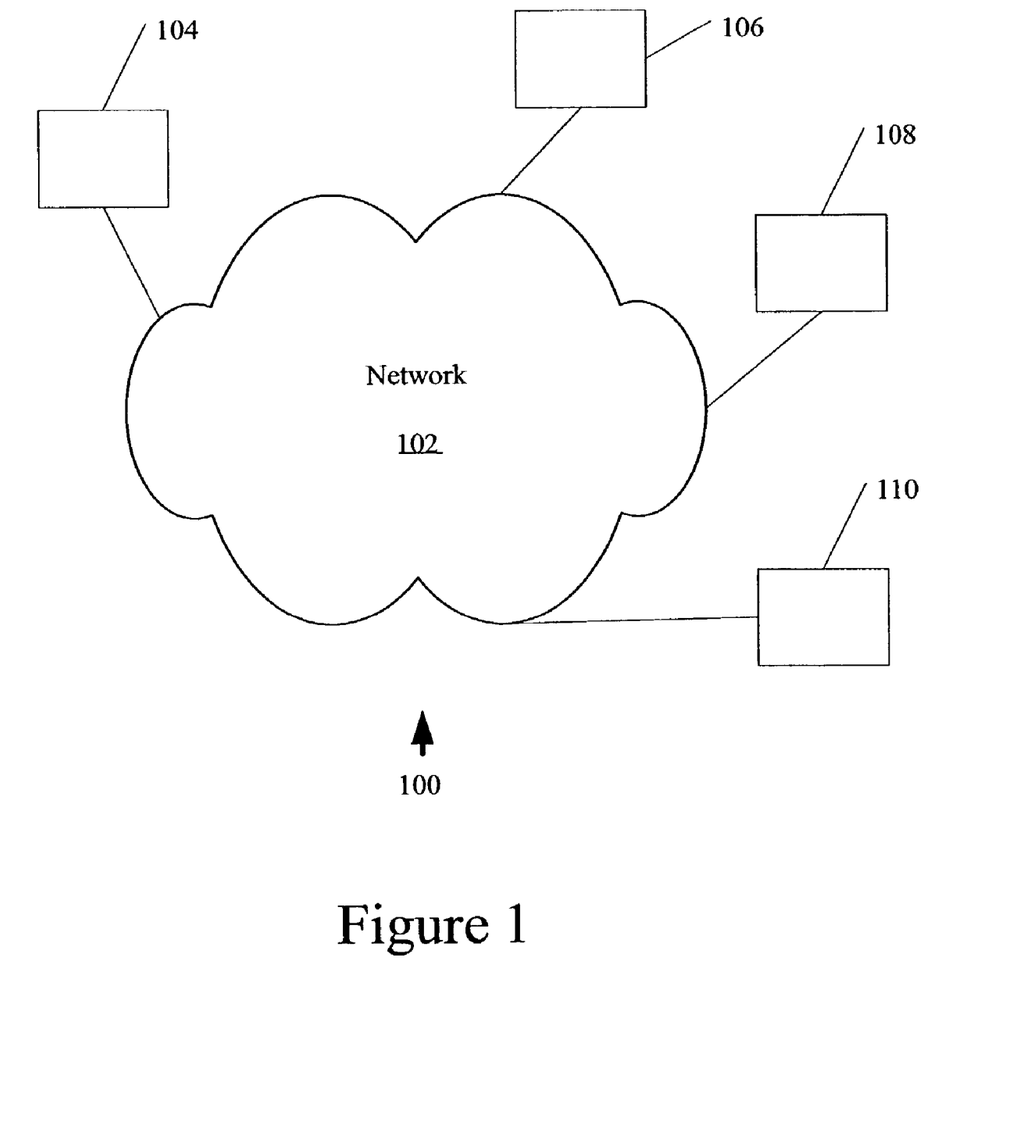
FIG. 1 shows an exemplary operating environment of the invention.

FIG. 1 illustrates an exemplary operating environment in which the invention may be implemented. System 100 is only one example of a suitable operating environment and is not intended to suggest any limitation as to the scope of use or functionality of the invention. System 100 is shown as including a communications network 102. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services such as Microsoft7 Network. Systems may also include more than one communication network, such as a LAN coupled to the Internet.

Elements 104, 106, 108 and 110, which may be separate computer devices or combined devices, may be coupled to communications network 102 through communication devices. Network interfaces or adapters may be used to connect computer devices 104, 106, 108 and 110 to a LAN. When communications network 102 includes a WAN, modems or other means for establishing a communications over WANs may be utilized. Computer devices 104, 106, 108 and 110 may communicate with one another via communication network 102 in ways that are well known in the art. The existence of any of various well-known protocols, such as TCP/IP, Ethernet, FTP, HTTP and the like, is presumed.

Elements 104, 106, 108 and 110 may exchange content, applications, messages and other objects via communications network 102.

Description of Embodiments

This invention introduces the concept of "universal license". A universal license can be used for different authentication and authorization purposes. The universal license can be used as a multipurpose license for both authentication and authorization and can have additional information added.

Figure 2A:
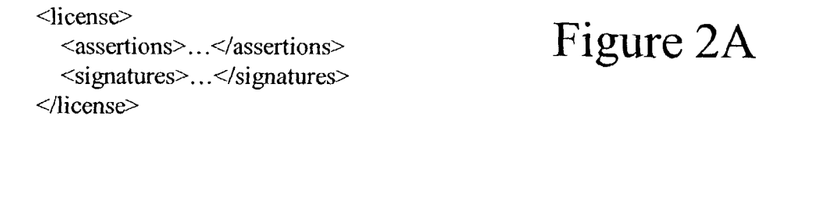
FIGS. 2A-2D show examples of portions of licenses described in eXtensible Markup Language (XML)

FIG. 2A illustrates a portion of a license described in eXtensible Mark-up Language (XML). XML is provided as an example of one language that may be used to describe licenses. The invention is not limited to only XML. For example, any language that supports extensible property->value mappings with referencing and nesting would be suitable. The license may contain one or more sets of related assertions followed by an indication of authenticity, related to one or more of the sets of related assertions proving that the assertion(s) came from a specific source. The indication of authenticity may be a digital signature, as is well known in the art. Although FIG. 2 shows only one assertions section and one signatures section, there may be multiple assertions sections (or multiple sections with different names containing assertions) and multiple signature sections (or multiple sections containing signatures). Further, any of the signature sections may include one or more signatures that sign other signatures. In an embodiment, one section may contain assertions and signatures, such that related signatures follow one or more related assertions.

An assertion is a statement that the license provides. These statements are intended to be used for a variety of purposes, including security, if the recipient determines that the statements are trusted. An example of an assertion includes, "all Microsoft Research employees are Microsoft employees." The assertion can be authenticated by a signature, or other method, that allows the recipient to verify the source of the assertion. For example, the above assertion may be signed by Microsoft Human Resources. An assertion can be any statement of purported fact, such as, identification, address, height, weight, etc.

Figure 2B:
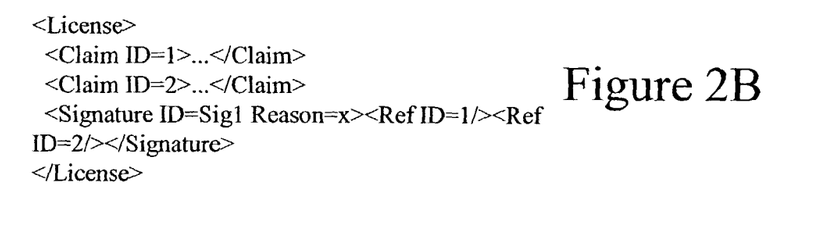
Figure 2C:
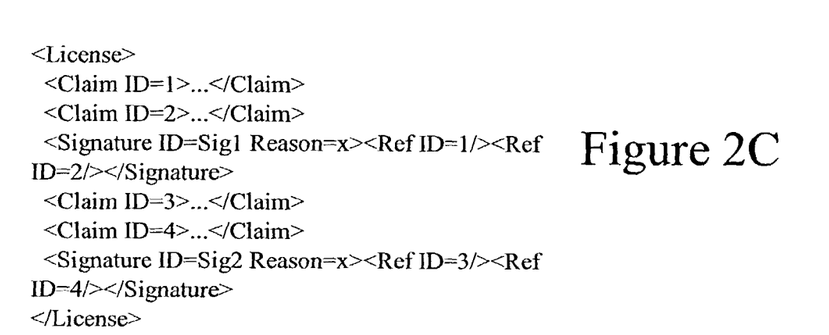
Figure 2D:
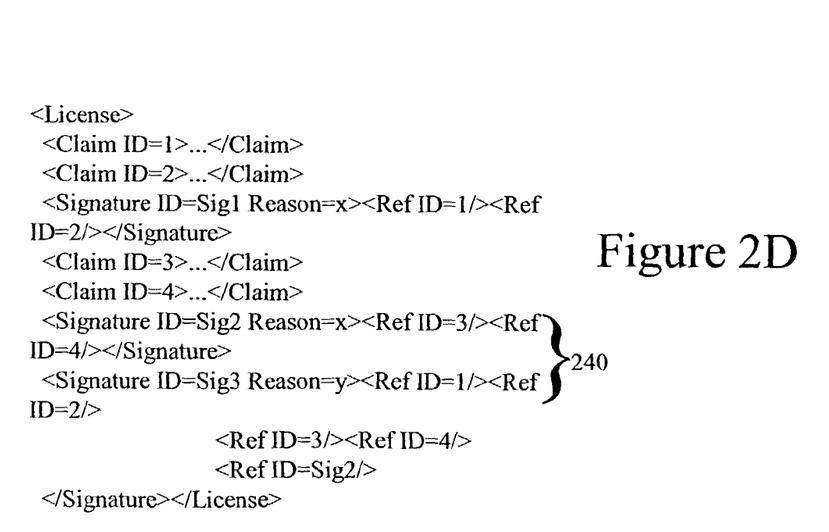

FIGS. 2B-2D illustrate other exemplary licenses. FIGS. 2B-2D illustrate that licenses may have assertions with IDs, for example, "Claim ID=1". Further signatures may also have IDs, such as, "Signature ID=1". Further, as FIGS. 2B-2D illustrate, a reason can be associated with a signature along with IDs that refer back to one or more related assertions or claims.

The format illustrated in FIGS. 2A-D allows different parties or authorities to sign or countersign licenses for different reasons. See, for example, 240 in FIG. 2D, which shows two signatures referring to different claims or assertions and different reasons (reason x and reason y). As an example, party A may assert an identity of "John Smith" and provide a digital signature corresponding to the assertion, while party B may assert the validity of John Smith's identity and provide a digital signature.

The format also allows for a trusted party to assert that another party can be trusted. For example, if party A is a trusted party, then party A can assert or claim, "you can trust party B", with corresponding digital signature of party A and a reason.

Figure 3:
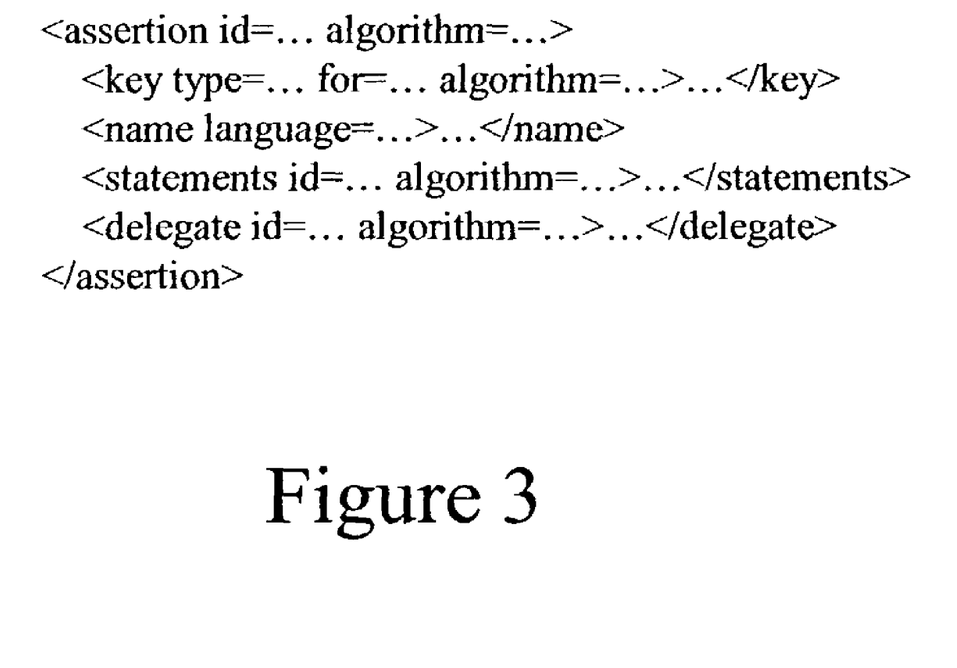
FIG. 3 shows an example of a portion of a license having assertions.

FIG. 3 provides an example of an assertion. The assertion may include a statement describing key type, such as an asymmetric key or a symmetric key, name in order to make a statement about a label for identifying a holder of a license. The keys may or may not be encrypted. Further, multiple names could be asserted and the keys may be targeted at different recipients, at the same recipients or some of the keys may be targeted at the same recipients while other keys are targeted at different recipients. Further, one or more statements may be made asserting right(s), capability(ies), or permission(s). As an example, suppose that a license is being given to parties A, B and C. A single license may be used and thus, the keys for each of A, B and C are included in the license, encrypted for each recipient. The same license may be re-used because, for example, the same assertions may apply to all three parties and the parties may be related in some way (e.g., different services of the same site).

In today's systems, when one party requires access to a resource to which another party has access, this can be accomplished via the use of ACLs or via impersonation. That is, one party can impersonate another party when attempting to access the resource in order to gain access. These solutions, however, cause problems regarding replication and granularity. For example, most ACLs are at the Read, Write and Delete level. Another big problem is traceability. For example, it may be difficult to determine who is logged in. Usually the party that is logged in is the impersonated entity not the impersonating identity on behalf of the impersonated entity.

Further, impersonation may have problems with timing. Current impersonation techniques are constrained to the original time scope of the authentication mechanism. No tighter timing can be defined. Thus, for example, it is difficult, if not impossible, to use impersonation to give a party access to a resource for a specific time, such as only during a twenty minute time interval on a particular day. As described below, delegation solves this timing issue. In addition, impersonation creates other problems, such as auditing problems because identities are lost.

Figure 4:
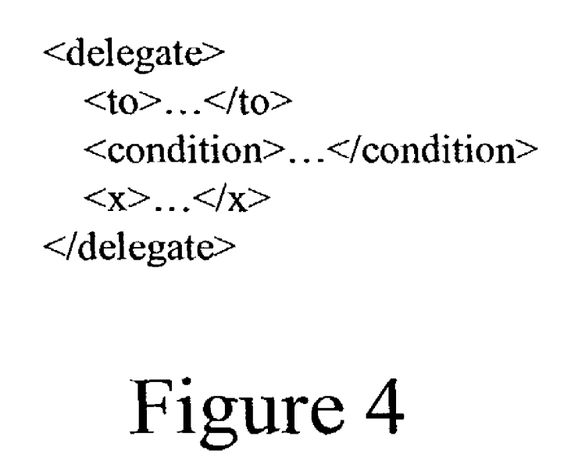
FIG. 4 shows an example of a portion of a license in which rights are delegated.

Delegation allows one party to transfer its rights to another party with respect to time, usage and restrictions. FIG. 4 provides an example of a delegation. For example, Bob gives Joe the right to look at his free time on Tue and schedule a single appointment. This example would be impossible to achieve with ACLs today because of timeliness and granularity issues. Further, the delegation may include conditions or restrictions that define or limit the conditions under which delegation can occur, define or limit the scope or use of delegation, or contain additional information that should be used during the delegation. The restrictions may be specified by a computer processing language, for example, a compiled language, such as: Java, C, C++, C#; a scripting language, such as, jscript and ecmascript; and an interpreted language, such as basic or an intermediate language such as java bytecode, Microsoft IL (MSIL), and p-code. As an example, of this feature, a function may be asserted to run on a message. In this example, a value of TRUE must be returned as a way to validate specific aspects of the message. Common conditions for delegation include, but are not limited to:

- Time periods or number of times a particular action may be allowed, such as "may read file X one time" or "may read file X only during the period between 7 AM and 8 AM"
- Depth (number of sub-delegations allowed), such as "cannot be sub-delegated." Note, the sub-delegation can contain its own set of conditions or restrictions such as "can be sub-delegated to individuals meeting these criteria" or can only be subdelegated to a particular individual or group.
- Delegation targets (to whom rights can or cannot be delegated)
- Delegation rights that the target must have or must not have. As an example, delegation to party X is allowed if X has a particular right, such as a "purchase order right", or delegation to party X is not allowed if X has a "bad credit" assertion.
- Specific cryptographic keys to "introduce delegates" (encrypted for the ultimate target(s)). As an example, suppose A is delegating to B the right to talk to C. A and B share a secret key "Sab" and A and C share a secret "Sac". A can authenticate and "introduce" B to C by giving B a secret key "Sbc" encrypted using key "Sab" and key "Sbc" encrypted using key "Sac" to give to C. B passes the secret key to C and informs C that the key is from A. C can extract Sbc and know that it came from A.
- Identity or logging trail for delegates, such as "Actions performed by delegate must be signed by this key and the delegate's key".

Other conditions or restrictions are also possible and the above are provided simply for illustrative purposes.

Further, a trusted party may indicate conditions under which another party may be trusted or not trusted. For example, trusted party A may assert, "you can trust party B only related to access of file X". As another example, trusted party A may assert, "you can trust party C unless party C is trying to access service Y". As a third example, trusted party A may assert, "you can trust http://example.com so long as it is making statements about namespaces within http://example.com".

Figure 5:
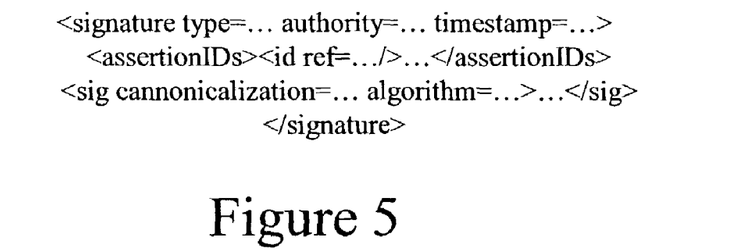
FIG. 5 shows an example of a license having a signature that specifically identifies assertions.

Assertions that cannot be verified as originating from a particular source are relatively uninteresting and are not particularly useful. Thus, assertions can contain some indication of authentication. Such an indication is typically done by a method that verifies the identity of the source of the assertion or verifies the identity of someone who vouches for the identity of the source of the assertion. Preferably, the assertion can be verified using the information contained in the license itself. One method to accomplish such verification is digital signatures. A digital signature, or more simply a signature, can specifically identify one or more assertions and there could be multiple reasons for a signature. FIG. 5 illustrates an example of a signature specifically identifying assertions. As an example, A might send a message and sign it as a "Sender". B might receive the message and validate that the signature matches the text, but not the validity of the sender's credentials and mark their signature as "Notary". C might then validate everything and make sure A's credentials are valid and mark "Verified". D, knowing A, might add a signature (after verifying), "Corroborated".

Another key aspect of a universal license is that the universal license may be augmented. In other words, the license can be extended without impacting existing indications of authentications, for example, digital signatures. For example, a user, Joe, may present a license to an admission service. The admission service validates the license and validates Joe's cryptographic proof and adds a countersignature attesting to the validity of the license presented by Joe. Joe may then present the license with the countersignature and may add a set of assertions about rights and sign them. In this way, the license is somewhat like a living passport.

As shown in FIG. 1, the system 100 may include a plurality of elements. The elements may be separate devices, such as computer or processor devices or some elements may be combined into a single physical device, while other elements remain in separate devices.

Each element may be included in one or more groups of elements. Elements are not limited to being included in only one group. For example, consider a system where clients download software from a software provider. The clients present a multipurpose license that is authenticated by an authenticator. Finally, an authorizer determines if a client is authorized to use the service. In such a system, any element that is included in the first group of elements is configured to provide the download service, using, for example, a web service. Any element included in a second group of elements is a client configured to present a multipurpose license, such as described above, to use the service. As mentioned above, the multipurpose license may include such things as one or more cryptographic keys for one or more recipients, delegation rights, assertions of trust, and conditions. Any element included in a third group of elements is configured to authenticate a holder of a multipurpose license. Finally, any element included in a fourth group is configured to authorize the holder of the multipurpose license to use the service according to the license.

Figure 6:
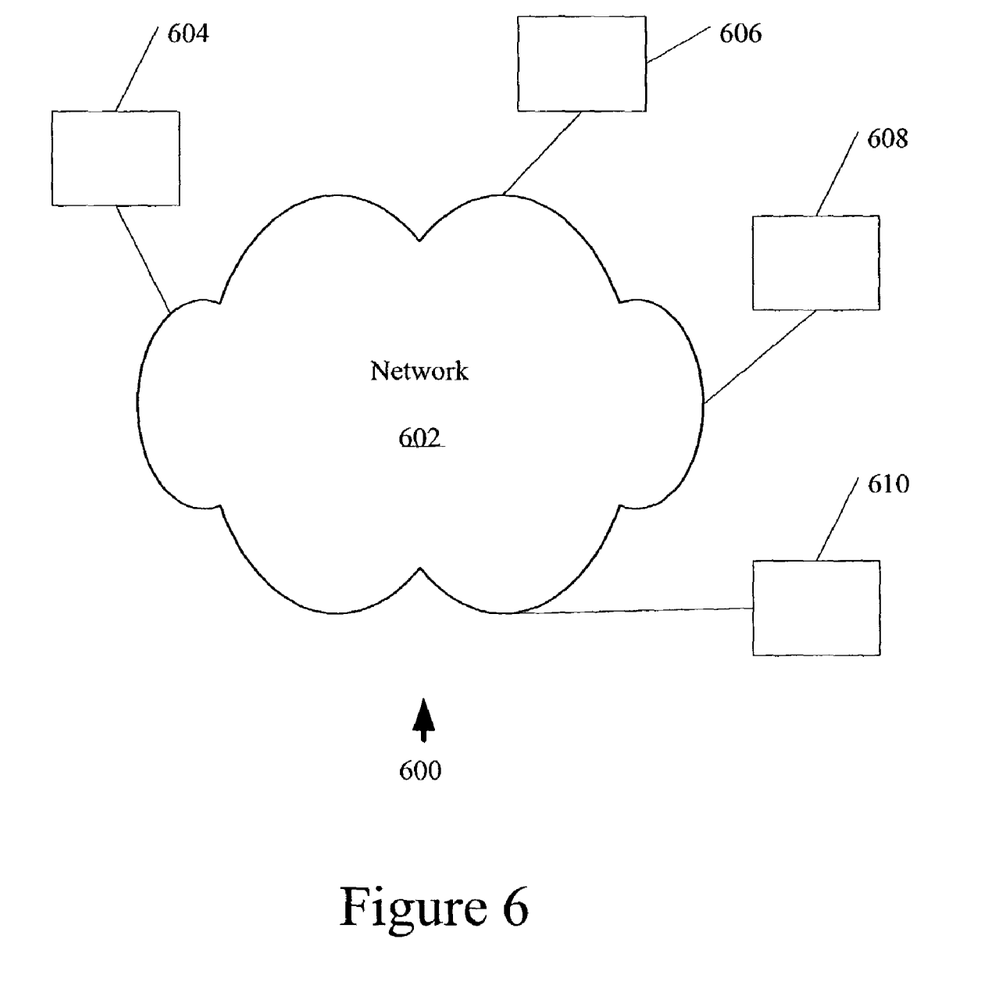
FIG. 6 illustrates an exemplary system for practicing an embodiment of the invention.

FIG. 6 illustrates an exemplary system 600 having elements included in the four groups connected via network 602. The elements may be in one or more physical devices. Network 602 may be a single network, such as a local area network (LAN) or may be a network of networks, such as the Internet, or a Wide Area Network (WAN), or a combination of various types of networks.

Following on with the above example, element 604 provides a web service. Thus, element 604 is included in the first group of elements. Element 606 may be a user device or element. Thus, element 606 may present a multipurpose license to use a service. Element 608 may be an element for authenticating a holder of a license. Finally, element 610 may be an element for authorizing a holder of a multipurpose license to use a service.

The following is an example of how the four elements may be used. Element 606 sends a request to use the service to element 604, which provides the service. The exemplary request may include an ID of a user requesting access to the service and may include an indication of authentication, such as a digital signature of the user. Element 604 may forward the request to element 608 for authentication.

Element 608 authenticates the user. This may be done by, for example, checking the digital signature provided by element 606 to determine if the user is who he says he is. Once authentication has been performed by element 608, an indication of authentication, for example, a digital signature of element 608 may be appended to the license with an accompanying assertion by element 608 that "element 608 asserts that the identity of the user has been authenticated".

The license may then be passed to element 610 to determine whether the specific authenticated user has authority to access the service. This may be done in a number of ways. For example, element 610 may consult an access control list (ACL) to determine whether the user is authorized for the requested type of access to the service. Alternatively, element 610 may have previously checked to determine whether the same user was authorized to access the service and may have returned a license to element 606 including the user's access rights from the ACL along with an indication of authentication, such as the digital signature of element 610. Thus, if element 606 has such a license, element 604 may save the license and may include the ACL and element 610's indication of authentication in the multipurpose license such that elements 608 and 610 may authenticate and authorize access based only on the information in the license.

As mentioned previously, elements may belong to multiple groups. For example, in an alternate embodiment, element 604 may be included in the second, third and fourth groups. In such an alternative embodiment, element 604 is configured to provide the service, authenticate holders of the multipurpose license, and authorize access to the service.

Further, in other alternate embodiments, the system may not have elements that are included in each of the four groups. For example, in a system that provides unrestricted access to a service to all users, elements may not be included in the fourth group because there may not be a need to check if a particular user is authorized to access the service.

Figure 7:
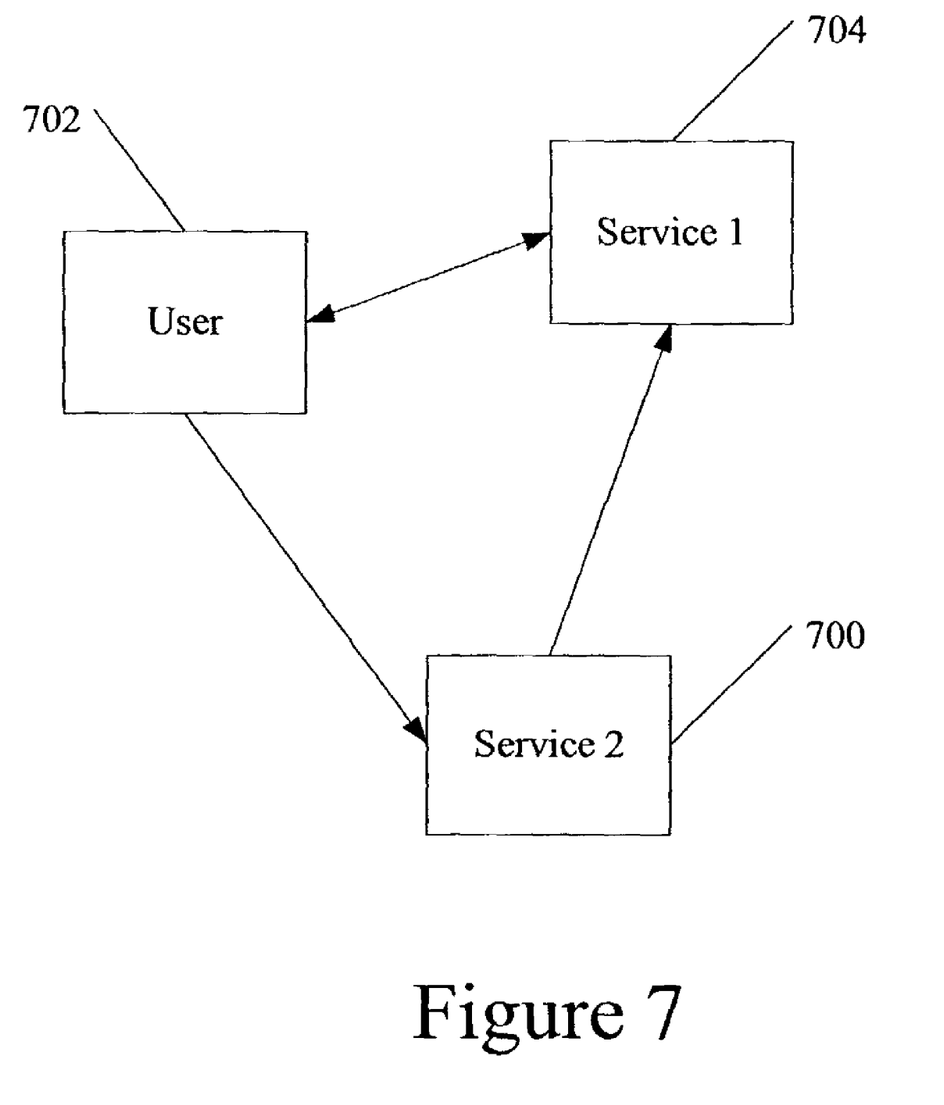
FIG. 7 illustrates an exemplary embodiment in which a license can be used to maintain anonymity.

FIG. 7 shows another example in which a license can be used to maintain anonymity. A user, via element 702 (included in the second group), requests a service from element 700 (included in the first group) by sending the request to another service, element 704 (included in the first, third and fourth groups). The request may be a request to download software from the service at element 700. Element 704 determines that the user is authenticated (the user is who he says he is), is authorized to access the service at element 700 for the download, returns a license to element 702 asserting that the user is authorized for the download and may pass an ID via the license, such as, for example, IDS 6341, to the user. The license may include an indication of authentication, such as a digital signature of element 704. Element 702 may then present the license to element 700 for the download. Alternatively, the license presented by element 702 may not include a user ID. Further, if a user ID such as 6341 is used, element 700 may report to element 704 a number of downloads that have been performed by a user having a particular ID, such as ID 6341. Note that although element 704 may have access to the ID of a user using element 702, the service at element 700 will either have no identification of the user, if a user ID does not appear in the license presented to the service at element 700, or element 700 is to be presented with an ID, such as ID 6341, which the service at element 700 will be unable to map to the user's identity.

Figure 8:
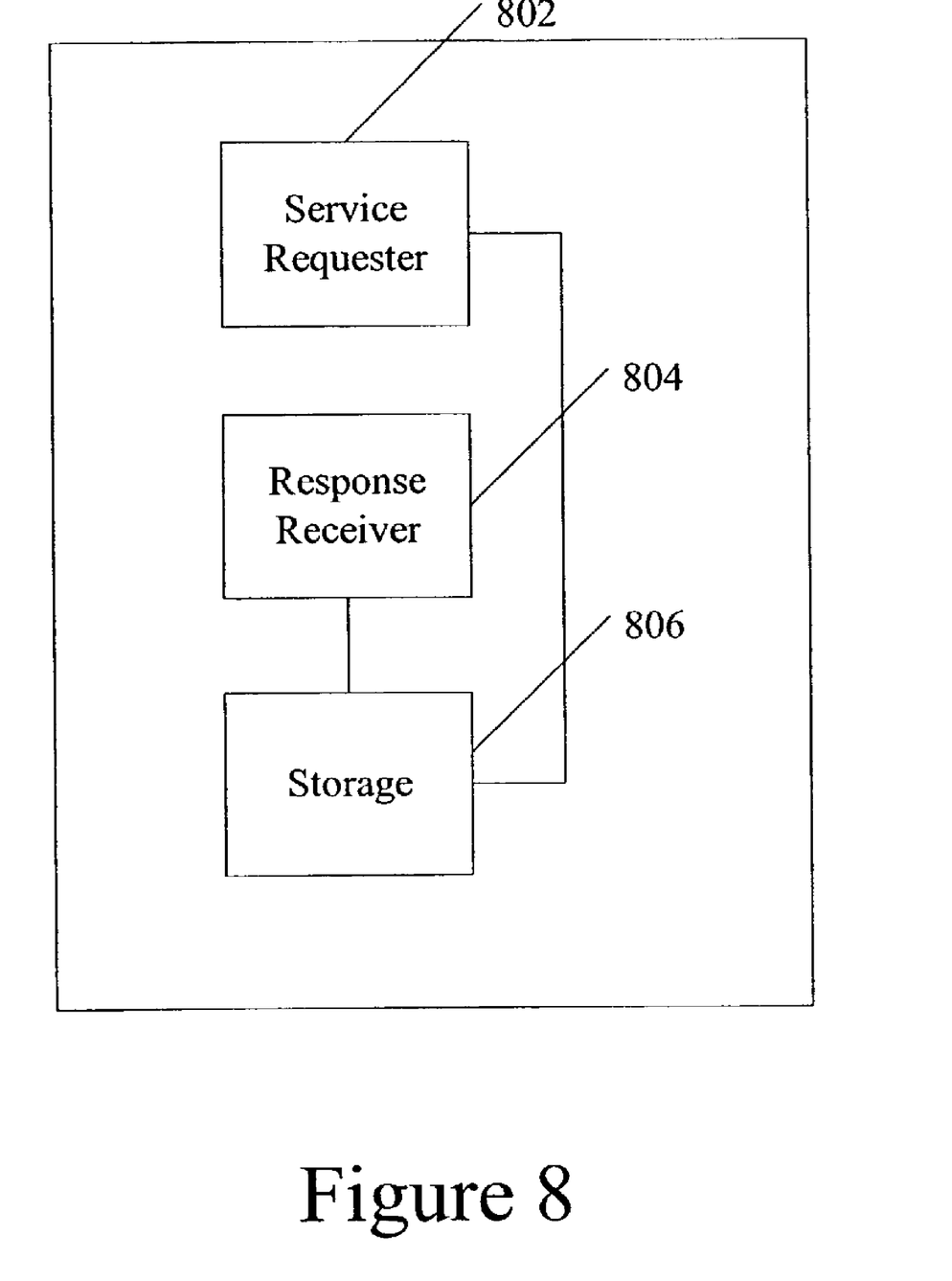
FIG. 8 is a functional diagram illustrating the functions of an exemplary processing device for practicing an aspect of the invention.

FIG. 8 is a functional diagram illustrating the functions within an exemplary processing device included in an element within the second group of elements for providing a service. The processing device includes service requester 802 for providing a request to a service (the request may include a multipurpose license), response receiver 804 for receiving a response from a service regarding the service request. The response may include access rights to use the service and storage 806, for storing received access rights.

Figure 9:
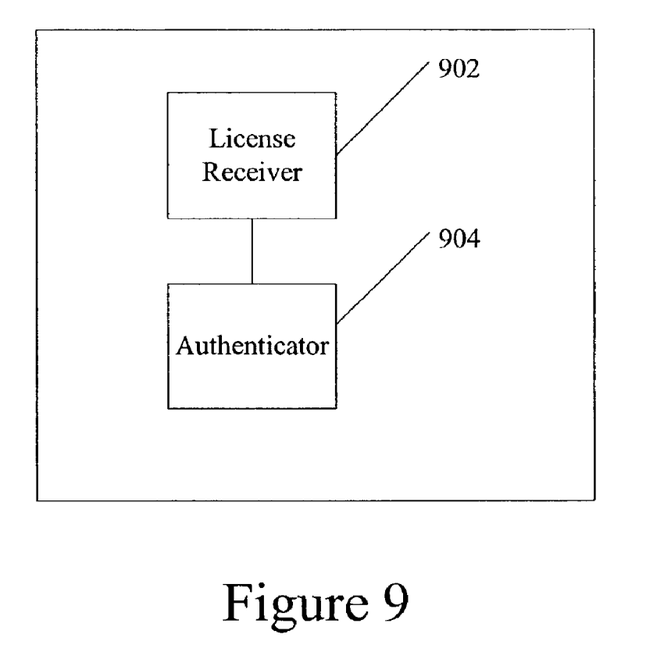
FIG. 9 is a functional diagram illustrating the functions of an exemplary processing device for practicing a second aspect of the invention.

FIG. 9 is a functional diagram illustrating the functions within an exemplary processing device included in an element within the third group of elements for authenticating a holder of a license The processing device includes license receiver 902 for receiving the license and authenticator 904 for authenticating an indication of authentication, such as, for example, a digital signature, to determine whether the holder of the license is who he claims to be.

Figure 10:
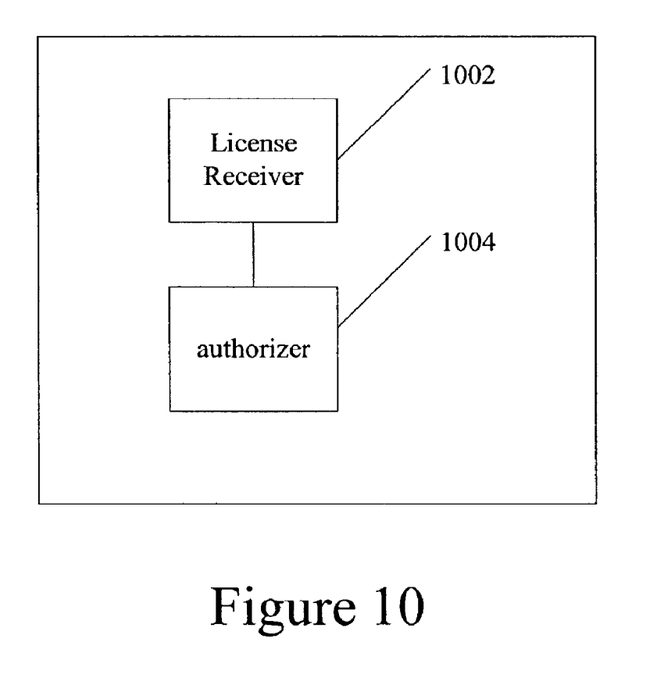
FIG. 10 is a functional diagram illustrating the functions of an exemplary processing device for practicing a third aspect of the invention.

FIG. 10 is a functional diagram illustrating the functions within an exemplary processing device included in an element within the fourth group of elements for checking whether the holder of a license is authorized for the requested access. The processing device includes license receiver 1002 for receiving the license and authorizer 1004 for determining whether the holder of the license is authorized. Authorizer 1004 may access an ACL to determine whether the requested access is to be permitted. If the requested access is permitted, authorizer 1004 sends an indication that the requested access is permitted. The indication may include a copy of the access rights of the holder and may include an indication of authentication, such as a digital signature from the processing device.

In the above embodiments, the functional elements of FIGS. 8 through 10 may be implemented via software, firmware, hardware or a combination of any of these. Further, instructions for configuring a processor to implement an embodiment of the invention may reside on a medium, such as computer memory, floppy disk, or removable optical disk. Furthermore, the different illustrations may be combined in to at least one device in various combinations or may all be separate.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A computer-implemented method for implementing a multipurpose license for both authorization and authentication, and which provides flexibility to handle different authentication and authorization purposes and mechanism, the method comprising:

accessing a multipurpose license, the multipurpose license including:
at least one assertion element, wherein each of the at least one assertion elements includes a statement attribute that includes one or more declarative statements describing a key type, and a separate delegate portion identifying one or more conditions under which rights under the multipurpose license can be delegated; and
a plurality of signature elements associated with the at least one assertion element, wherein the plurality of signature elements are from a plurality of different authorities, and wherein each of the plurality of different signature elements includes a reason attribute providing an explicit identification of a reason why the signature element is included in the multipurpose license;
using the at least one assertion element of the multipurpose license for authentication purposes, by verifying an identity of a source of the assertion in the multipurpose license;
using at least one of the signature elements of the multipurpose license for authorization purposes, wherein the multipurpose license is used for a service.

2. The method of claim 1, wherein at least one of the signature elements is included for all of the reasons included in the license.

3. The method of claim 1, wherein at least one of the signature elements is included for multiple, but not all, of the reasons included in the license.

4. The method of claim 1, wherein at least two of the signature elements are each included for a plurality of different reasons and the reasons corresponding to one of the at least two signature elements differ from the reasons corresponding to other(s) of the signature elements.

5. The method of claim 1, wherein at least two of the signature elements are each included for a plurality of same reasons.

6. The method of claim 1, wherein at least two of the signature elements are each included for a plurality of reasons and some of the reasons corresponding to one of the at least two signature elements are identical to the reasons corresponding to other(s) of the signature elements.

7. The method of claim 1, further comprising extending the license without affecting existing ones of the signature elements and the corresponding reasons.

8. The method of claim 1, further comprising adding at least one signature element and a corresponding reason why each of the at least one signature is provided without affecting already existing ones of the signature elements and the corresponding ones of the reasons.

9. A computer-implemented method for implementing a multipurpose license for both authorization and authentication, and which provides flexibility to handle different authentication and authorization purposes and mechanism, the method comprising:

accessing a schematized multipurpose license governing access to a resource, the schema of the multipurpose license supporting extensible property to value mappings with referencing and nesting, and the multipurpose license including:

at least one addressable portion, each of the at least one addressable portion(s) including at least one assertion element, wherein each of the at least one assertion elements includes a statement attribute that includes one or more declarative statements describing a key type, and a separate delegate portion identifying one or more conditions under which rights under the multipurpose license can be delegated, wherein at least one delegate portion is restricted to a specific number of times the resource may be accessed, a specific time period or window during which access to the resource is allowed, or a specific use for which access to the resource is allowed, and at least one delegate portion including a specification of a number of sub-delegations allowed; and a plurality of signature elements associated with the at least one assertion element, wherein the plurality of signature elements are from a plurality of different authorities, and wherein each of the plurality of different signature elements includes a reason attribute providing an explicit identification of a reason why the signature element is included in the multipurpose license, wherein at least one of the plurality of signature elements is a countersignature, and the explicit identification of the reason why the countersignature is included is to attest to validity of the multipurpose license;

using the at least one assertion element of the multipurpose license for authentication purposes, by verifying an identity of a source of the assertion in the multipurpose license;

using at least one of the signature elements of the multipurpose license for authorization purposes, wherein the multipurpose license is used for a service.

* * * * *